United States Patent
Liu et al.

(10) Patent No.: US 11,563,557 B2
(45) Date of Patent: Jan. 24, 2023

(54) DOCUMENT TRANSFER PROCESSING FOR BLOCKCHAINS

(71) Applicant: International Business Machines Corporation, Armonk, NY (US)

(72) Inventors: Chih-Hsiung Liu, Taipei (TW); Joey H. Y. Tseng, Taipei (TW); Chih-Wen Su, Taipei (TW); June-Ray Lin, Taipei (TW); Gary P. Noble, Warwick (GB)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 15/960,662

(22) Filed: Apr. 24, 2018

(65) Prior Publication Data

US 2019/0327080 A1  Oct. 24, 2019

(51) Int. Cl.
*H04L 9/06* (2006.01)
*H04L 9/32* (2006.01)
*H04L 9/40* (2022.01)

(52) U.S. Cl.
CPC .......... *H04L 9/0637* (2013.01); *H04L 9/3265* (2013.01); *H04L 63/0209* (2013.01); *H04L 63/08* (2013.01)

(58) Field of Classification Search
CPC ... H04L 9/0637; H04L 63/0209; H04L 63/08; H04L 9/3265; H04L 2209/56; H04L 2209/38; H04L 9/0891; H04L 9/3247; H04L 9/3239; G06F 21/6218
See application file for complete search history.

(56) References Cited

U.S. PATENT DOCUMENTS

| | | | |
|---|---|---|---|
| 9,608,829 B2 | 3/2017 | Spanos et al. | |
| 9,635,000 B1 | 4/2017 | Muftic | |
| 9,774,578 B1 | 9/2017 | Ateniese et al. | |
| 9,794,074 B2 | 10/2017 | Toll et al. | |
| 9,990,504 B1 * | 6/2018 | Chapman | G06F 21/645 |
| 9,992,022 B1 * | 6/2018 | Chapman | G06F 21/64 |
| 10,025,941 B1 * | 7/2018 | Griffin | G06F 21/64 |
| 10,102,526 B1 * | 10/2018 | Madisetti | G06Q 20/389 |
| 10,291,395 B1 * | 5/2019 | Nenov | H04L 63/0428 |
| 2015/0379510 A1 * | 12/2015 | Smith | G06Q 20/3829 705/71 |

(Continued)

FOREIGN PATENT DOCUMENTS

| | | |
|---|---|---|
| AU | 2018100150 | 3/2018 |
| WO | 2017098519 A1 | 6/2017 |

(Continued)

OTHER PUBLICATIONS

Carroll et al.; "The Third R3 Smart Contrcat Templates Summit", London and NewYork, Hosted at Barclays Rise, Jun. 13, 2017, pp. 1-167.

(Continued)

*Primary Examiner* — Saleh Najjar
*Assistant Examiner* — Nhan Huu Nguyen

(57) ABSTRACT

An example operation may include one or more of configuring a blockchain network comprising first and second blockchain nodes, providing, by the first blockchain node, a data reference to the second blockchain node, accessing a document, by the second blockchain node, from the first blockchain node, and providing by the second blockchain node, a proof of receipt for the document to a shared blockchain ledger.

17 Claims, 12 Drawing Sheets

(56) References Cited

U.S. PATENT DOCUMENTS

| | | | |
|---|---|---|---|
| 2017/0011460 A1* | 1/2017 | Molinari | H04L 63/0823 |
| 2017/0046651 A1* | 2/2017 | Lin | G06Q 10/08 |
| 2017/0048216 A1* | 2/2017 | Chow | H04L 9/0891 |
| 2017/0085545 A1 | 3/2017 | Lohe et al. | |
| 2017/0140408 A1 | 5/2017 | Wuehler | |
| 2017/0155515 A1 | 6/2017 | Androulaki et al. | |
| 2017/0214522 A1* | 7/2017 | Code | H04L 63/0861 |
| 2017/0220815 A1 | 8/2017 | Ansari et al. | |
| 2017/0228731 A1* | 8/2017 | Sheng | G06Q 20/36 |
| 2017/0243193 A1 | 8/2017 | Manian et al. | |
| 2017/0243215 A1* | 8/2017 | Sifford | G06Q 20/10 |
| 2017/0243287 A1* | 8/2017 | Johnsrud | G06Q 40/025 |
| 2017/0329980 A1* | 11/2017 | Hu | G06F 21/606 |
| 2017/0344988 A1* | 11/2017 | Cusden | G06F 21/00 |
| 2017/0372300 A1* | 12/2017 | Dunlevy | G06Q 20/36 |
| 2018/0089758 A1* | 3/2018 | Stradling | H04L 63/105 |
| 2018/0123779 A1* | 5/2018 | Zhang | H04L 9/0637 |
| 2018/0139042 A1* | 5/2018 | Binning | H04L 9/3297 |
| 2018/0173719 A1* | 6/2018 | Bastide | G06F 16/13 |
| 2018/0191503 A1* | 7/2018 | Alwar | H04L 9/0637 |
| 2018/0211043 A1* | 7/2018 | Husain | H04L 9/3239 |
| 2018/0218176 A1* | 8/2018 | Voorhees | H04L 9/3239 |
| 2018/0225640 A1* | 8/2018 | Chapman | G06Q 20/0855 |
| 2018/0227116 A1* | 8/2018 | Chapman | G06F 9/451 |
| 2018/0232526 A1* | 8/2018 | Reid | H04L 9/3213 |
| 2018/0248699 A1* | 8/2018 | Andrade | H04L 9/0897 |
| 2018/0257306 A1* | 9/2018 | Mattingly | H04L 9/0637 |
| 2018/0330077 A1* | 11/2018 | Gray | H04L 9/3297 |
| 2018/0330125 A1* | 11/2018 | Gray | G06F 21/74 |
| 2018/0343114 A1* | 11/2018 | Ben-Ari | G06F 21/64 |
| 2018/0343120 A1* | 11/2018 | Andrade | H04L 9/3231 |
| 2019/0044727 A1* | 2/2019 | Scott | H04L 9/3247 |
| 2019/0057379 A1* | 2/2019 | Chalakudi | H04L 29/06 |
| 2019/0058697 A1* | 2/2019 | Chang | H04L 9/3247 |
| 2019/0095909 A1* | 3/2019 | Wright | G06F 21/602 |
| 2019/0114182 A1* | 4/2019 | Chalakudi | H04L 63/0435 |
| 2019/0122208 A1* | 4/2019 | Richardson | G06Q 20/0658 |
| 2019/0123889 A1* | 4/2019 | Schmidt-Karaca | H04L 9/3236 |
| 2019/0163896 A1* | 5/2019 | Balaraman | H04L 9/0637 |
| 2019/0164157 A1* | 5/2019 | Balaraman | H04L 9/3239 |
| 2019/0188700 A1* | 6/2019 | August | G06Q 20/3827 |
| 2019/0236598 A1* | 8/2019 | Padmanabhan | G06Q 20/4016 |
| 2019/0243572 A1* | 8/2019 | Kursun | G06F 3/061 |
| 2019/0303920 A1* | 10/2019 | Balaraman | H04L 63/12 |
| 2019/0303942 A1* | 10/2019 | Balaraman | H04L 63/12 |
| 2019/0311148 A1* | 10/2019 | Andrade | H04L 63/102 |
| 2019/0311392 A1* | 10/2019 | Swamidurai | H04L 63/0442 |
| 2019/0327218 A1* | 10/2019 | Altenhofen | G06F 16/2308 |
| 2019/0354725 A1* | 11/2019 | Lowagie | G06F 21/64 |

FOREIGN PATENT DOCUMENTS

| | | | | |
|---|---|---|---|---|
| WO | WO-2017098519 A1 * | 6/2017 | | H04L 63/10 |
| WO | 2017136879 A1 | 8/2017 | | |
| WO | 2017145019 A1 | 8/2017 | | |
| WO | WO-2017136879 A1 * | 8/2017 | | H04L 9/0891 |
| WO | WO-2017145019 A1 * | 8/2017 | | G06Q 20/3829 |
| WO | 2018026727 A1 | 2/2018 | | |

OTHER PUBLICATIONS

Kirkman et al., "Using Smart Contracts and Blockchains to Support Consumer Trust Across Distributed Clouds", GCC'17, CSREA Press, Jul. 17-20, 2017, pp. 10-16.

Mery et al.; "Make Your Blockchain Smart Contracts Smater With Business Rules", IBM Corporation, Aug. 14, 2017, pp. 1-21.

Tran et al.; "Regerator: A Registry Generator For Blockchain", CAiSE 2017, Forum and Doctoral Consortium Papers, Jun. 2017, pp. 81-88.

International Search Report and Written Opinion that issued in the corresponding international application No. PCT/EP2019/058525, dated Jun. 3, 2019.

* cited by examiner

108

DOCUMENT TRANSFER PROCESSING FOR BLOCKCHAINS

TECHNICAL FIELD

This application generally relates to blockchain networks, and more particularly, to document transfer processing on a distributed ledger (such as a blockchain).

BACKGROUND

A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. Blockchain is a distributed database that maintains a continuously-growing list of records in the blockchain blocks, which are secured from tampering and revision due to their immutable properties. Each block contains a timestamp and a link to a previous block. Blockchain can be used to hold, track, transfer and verify information. Since blockchain is a distributed system, before adding a transaction to the blockchain ledger, all peers need to reach a consensus status.

Conventionally, document transfers between entities involving secure gateways lack an immutable record of document transfers and receipt verification. As such, what is needed is a multi-entity blockchain network to provide a receipt record for all transferred documents and overcome these limitations.

SUMMARY

One example embodiment may provide a method that includes one or more of configuring a blockchain network comprising first and second blockchain nodes, providing, by the first blockchain node, a data reference to the second blockchain node, accessing a document, by the second blockchain node, from the first blockchain node, and providing by the second blockchain node, a proof of receipt for the document to a shared blockchain ledger.

Another example embodiment may provide a system that includes a blockchain network including a cloud broker including a root node, and first and second blockchain nodes. The first blockchain node is configured to provide a data reference. The second blockchain node is configured to receive the data reference from the first blockchain node, and in response access a document from the first blockchain node and provide a proof of receipt for the document to a shared blockchain ledger.

A further example embodiment may provide a non-transitory computer readable medium including instructions, that when read by a processor, cause the processor to perform one or more of configuring a blockchain network including first and second blockchain nodes, providing, by the first blockchain node, a data reference to the second blockchain node, accessing a document, by the second blockchain node, from the first blockchain node, and providing by the second blockchain node, a proof of receipt for the document to a shared blockchain ledger.

DETAILED DESCRIPTION

Figure 1A:
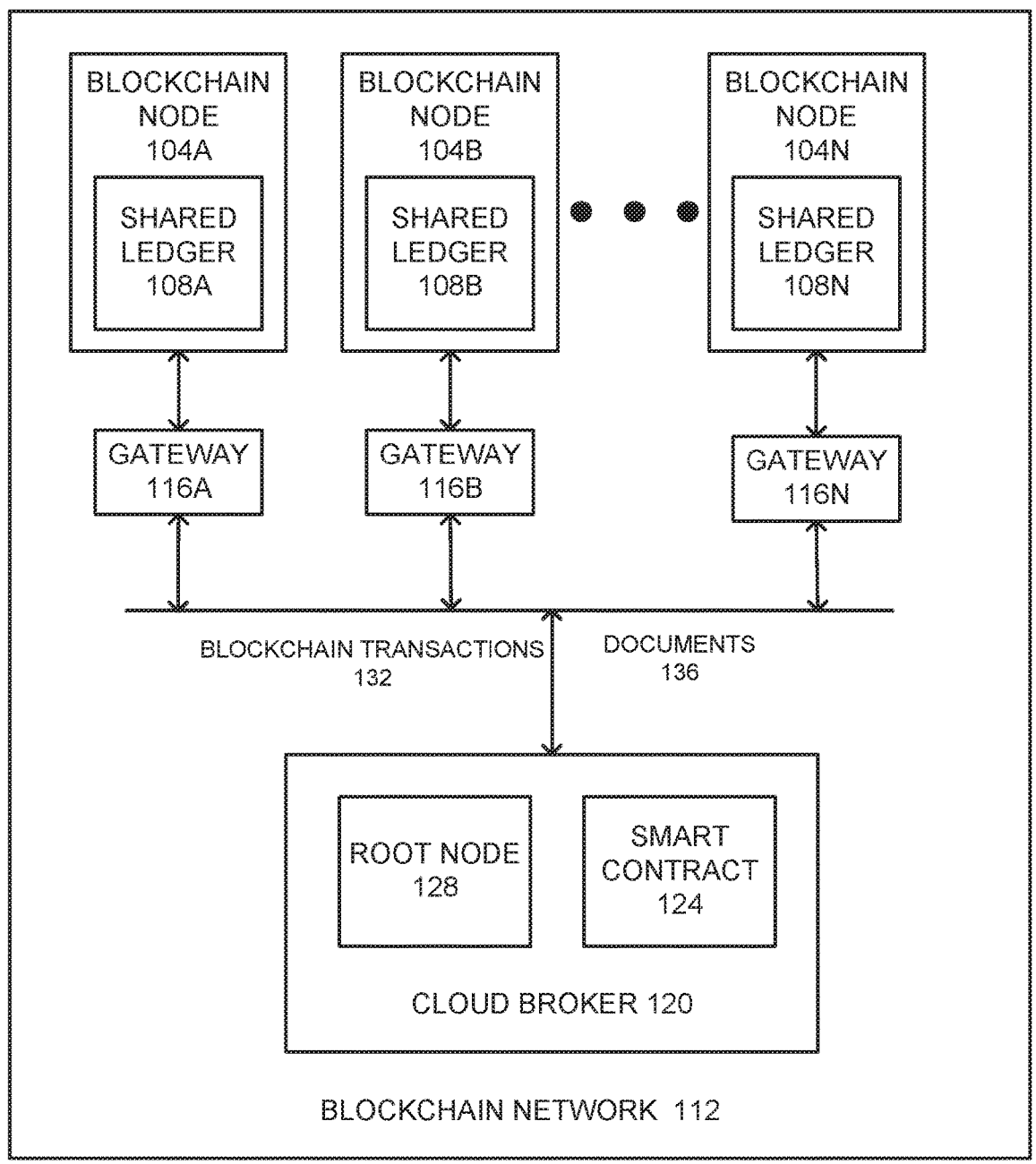
FIG. 1A illustrates a network diagram of a document sharing system with a blockchain, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling. Example embodiments provide methods, devices, networks and/or systems, which provide biometric threat intelligence processing for blockchains.

A blockchain is a distributed system which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database, which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

For business partners to exchange business data, it is commonly required for one partner to configure a gateway capable of sending & receiving data to and from its business partners. Traditionally the best practice is to set up exchange profiles (e.g. based on B2B CPA specification) that define exchange details among trading partners such as transport level and security level requirements. However, this process normally requires non-trivial efforts because it involves manual processes from multiple parties to define the exchange details. Also, connectivity may be another major problem since these gateways typically located in protected networks, where an organization's firewalls make it much harder to connect the gateway for configuration purposes from the internet. To solve those problems, what is needed is a mechanism that sets up a virtually connected business network to enable smart contracts between business partners to manage document transfers.

FIG. 1A illustrates a logic network diagram of a document sharing system in a blockchain, according to example embodiments. Referring to FIG. 1A, the network 100 includes a blockchain network 112, which includes blockchain nodes 104. The blockchain nodes 104 represent various organizations desiring to share any type of documents 136. Since the participants in the blockchain network 112 are well-defined organizations, the blockchain network 112 is most commonly a permissioned blockchain. However, a public blockchain (e.g., Ethereum) could also be used for this purpose with suitable modifications. Any of blockchain nodes 104 may be an originating node 104, which shares documents with other blockchain nodes 104. Any number of blockchain nodes 104 may be included in blockchain network 112, and three blockchain nodes 104A, 104B, and 104N are illustrated. Blockchain technology establishes a virtual network among business partners or nodes 104, where reversed tunnel technologies allow partners to setup a blockchain infrastructure.

Each of the blockchain nodes 104 has an associated gateway 116, shown as gateway 116A associated with blockchain node 104A, gateway 116B associated with blockchain node 104B, and gateway 116N associated with blockchain node 104N. Gateways 116 each include a configuration that contains communication parameters (e.g. encryption, credential, and port). A common existing practice to exchange gateway configuration using a manual process (e.g. B2B CPA profile), and the major challenge to automate this process is the gateways 116 are commonly located in a segregated network that prevents other system from accessing and configuring the gateway. A CPA file is an XML document that enumerates the valid, visible, and enforceable interactions that are required for two partners to collaborate and interchange B2B documents. The CPA file contains the communication protocol, reliable messaging process information, request and response security, message transport, and document envelope details.

A blockchain provides an infrastructure for partners to exchange credentials to setup a virtual private network (VPN) for communication, but another challenge of using blockchain networks for business-to-business (B2B) use cases is that partners are often not comfortable placing critical data or documents outside their organization in a blockchain. Currently, a general approach is to put sensitive data or documents within another data store (with a pointer, URL, and included hash to prove validity of documents).

Blockchain network 112 includes one or more cloud brokers 120, which include a root node 128 and a smart contract 124, which each of blockchain nodes 104 sign. A smart contract 124 includes an IP address and/or port identifier for the root node 128, and a set of credentials for each of the business partners/blockchain nodes 104 that wish to transfer documents 136. A communication agreement within a smart contract 124 may be created on the cloud broker 120 and imported to each gateway 116. Based on the communication agreement in the smart contract 124, each partner could join a blockchain network 112 with limited scope (for example, only partners 104 with a signed communication agreement or smart contract 124 may join).

Documents 136 are transferred outside of the blockchain transactions 132 between the blockchain nodes 104. When ready to share one or more documents 136 or a configuration, an originating node 104 sends a data reference (e.g. a URL) of the data to blockchain network 112. Participant nodes 104 that have signed the smart contract 124 are then able to access the document(s) 136 via the data reference and pull a copy to their own network storage using their credentials. Participant nodes 104 provide proof that they have received the document(s) 136 by combining a hash of the document 150, a salt 154, and their own identifier 158 to form a receipt 144, signing it, and creating a blockchain transaction 132. This may only be performed if participant nodes 104 have accessed and hashed the document 136.

A salt is random data that is used as an additional input to a one-way function that "hashes" data, a password, or a passphrase. Salts are closely related to the concept of nonce. The primary function of salts is to defend against dictionary attacks or against its hashed equivalent, a pre-computed rainbow table attack. Salts are sometimes used to safeguard passwords in storage. Historically a password may be stored in plaintext on a system, but over time additional safeguards have been developed to protect a user's password against being read from the system. A salt is one of those methods.

In response to transferring documents 136 between blockchain nodes 104, blockchain transactions 132 are generated by blockchain nodes 104 that receive documents 136. The blockchain transactions 132 store receipts in the distributed shared ledgers 108 associated with each blockchain node 104, as described with reference to FIGS. 1B and 4B. Advantageously, the present application allows for protected document transfers between peers or partners, while allowing each partner to maintain critical data and documents on-premises. In summary, the present application provides a mechanism for business partners to establish a communication network by leveraging a cloud broker 120. Once the network 112 is established, partners can exchange both gateway 116 configuration and business documents 136 with non-repudiation records stored in the blockchain network 112. Partners may maintain documents 136 on-premises by sending a data reference to the other partners, and partners with the data reference could decide whether to retrieve the documents 136, or not, but their access record would maintained in the blockchain.

Figure 1B:
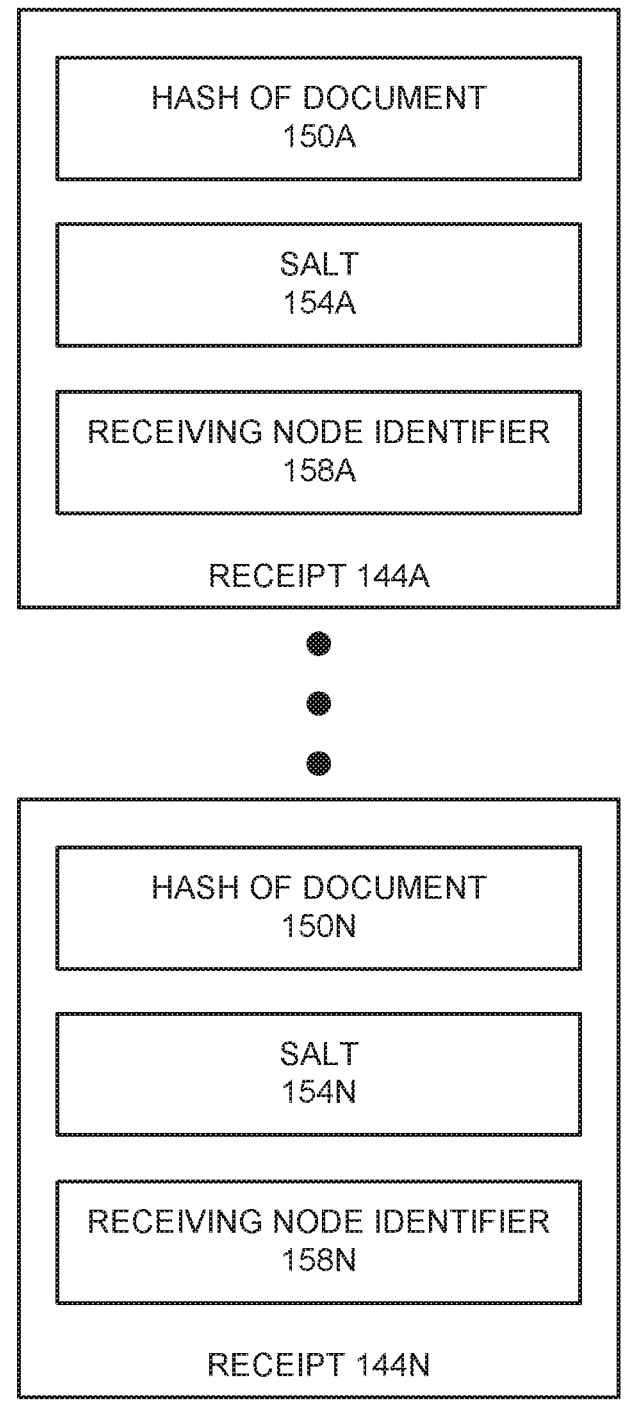
FIG. 1B illustrates a network diagram of shared ledger contents in a blockchain, according to example embodiments.

FIG. 1B illustrates a diagram of shared ledger 108 contents in a blockchain, according to example embodiments. Referring to FIG. 1B, the shared ledgers 108 include receipts contents 144. Each blockchain node 104 receiving a document 136 creates receipts 144, as described in more detail with respect to FIG. 4B, and generates blockchain transactions to store the receipt contents 144 on the blockchain. Because the blockchain includes receipts 144 for all received documents 136, there are a group of receipts 144 stored on the blockchain and in the shared ledgers 108, identified in FIG. 1B as receipt 144A through receipt 144N.

Receipt contents 144 each include one or more of a hash of the document(s) 150, a salt 154, and a receiving node identifier 158. For N receipts 144, corresponding to receipts 144A through 144N, there are corresponding hashes of documents 150A through 150N, salts 154A through 154N, and receiving node identifiers 158A through 158N, respectively. A hash is a function that can be used to map data of arbitrary size to data of fixed size. Thus a hash of a document 150 reduces the hashed document to a fixed size. A salt 154 is random data that is used as an additional input to a one-way function that "hashes" data. A receiving node identifier 158 is any alphanumeric or other type of string that uniquely identifies a receiving node 104.

In some cases. participant nodes 104 may elect to accept a risk of receiving a wrong document 136 by not creating and submitting a receipt 144 to the blockchain. However, receiving a wrong document 136 may have a business cost or other adverse result. If a participant node 104 denies having accessed a document 136, there if proof (through the receipts 144 stored in the shared ledgers 108) they did.

Figure 2A:
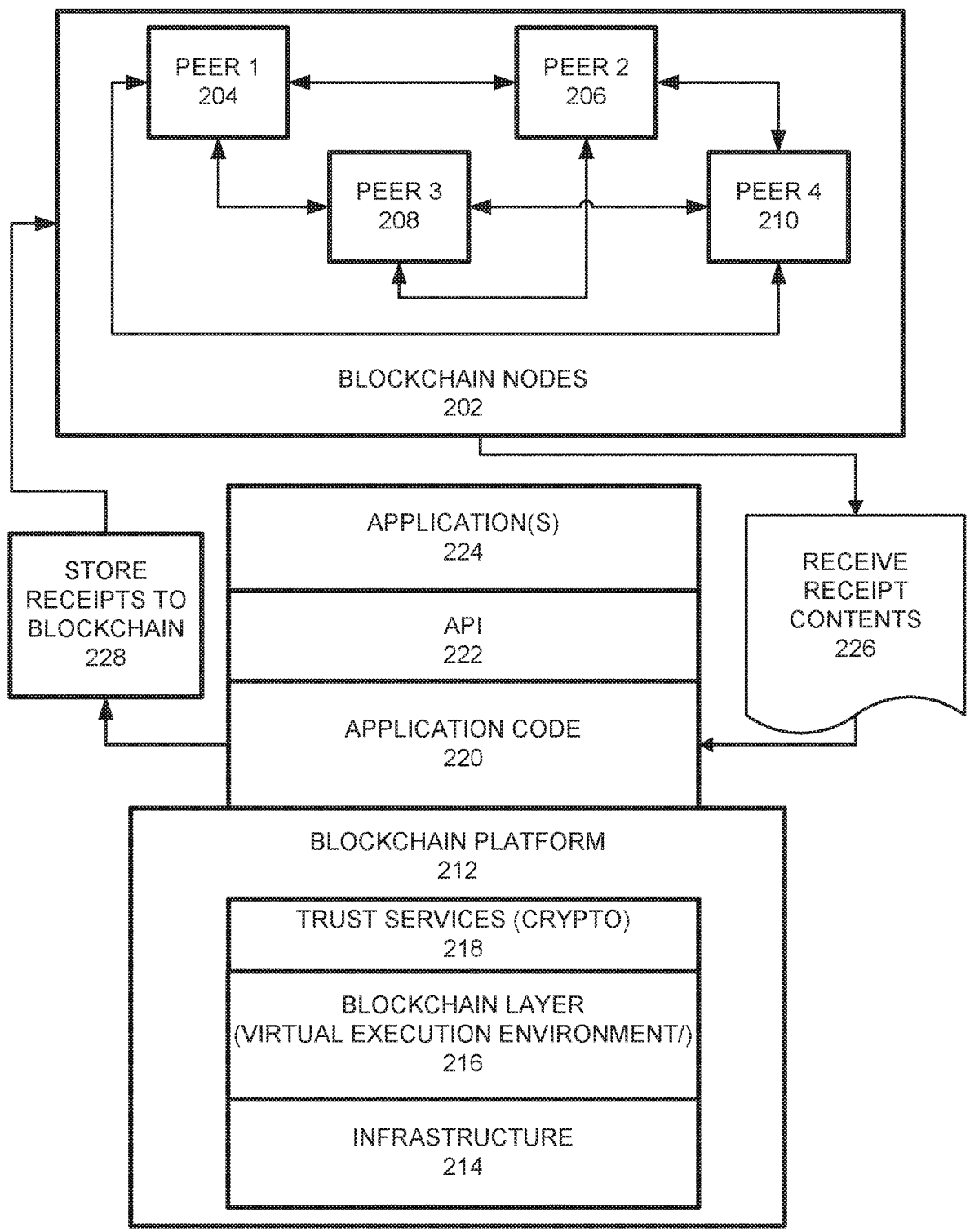
FIG. 2A illustrates an example peer node blockchain architecture configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210. (4 nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, receipt contents 226 may be received from a blockchain node 202 that received a document 136 from a different blockchain node 202, and may be processed by one or more processing entities (e.g., virtual machines) included in the blockchain layer 216. The receipts 228 are each recorded to the shared ledger 108, and may include the contents of the receipt 226 described in more detail with respect to FIG. 1B. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, a blockchain node 202 receives receipt contents 226, which includes a hash of the document 150, a salt 154, and a receiving node identifier 158. One function may be to create and submit a receipt as a blockchain transaction, which may be provided to one or more of the nodes 204-210.

Figure 2B:
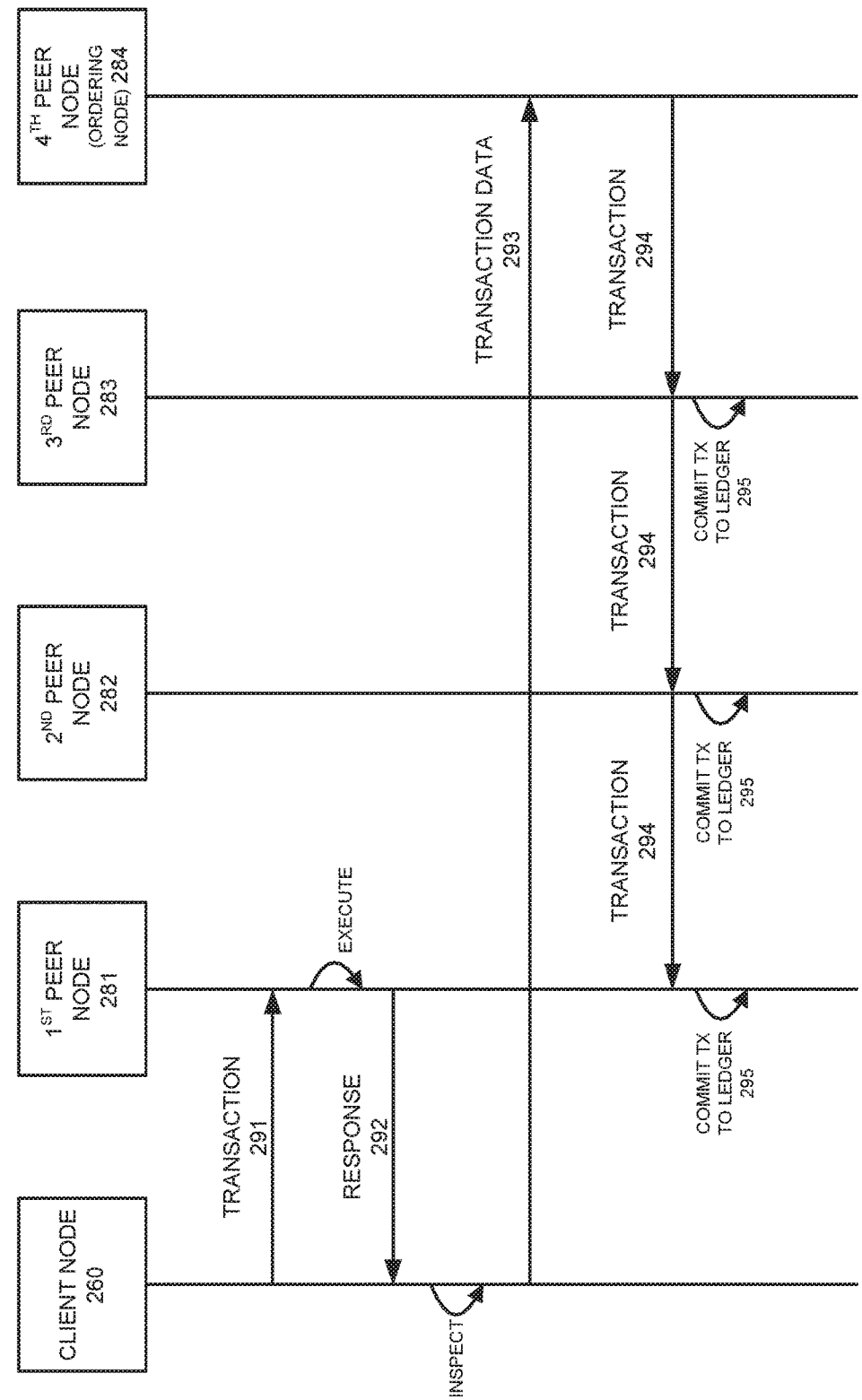
FIG. 2B illustrates an example peer node blockchain configuration, according to example embodiments.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
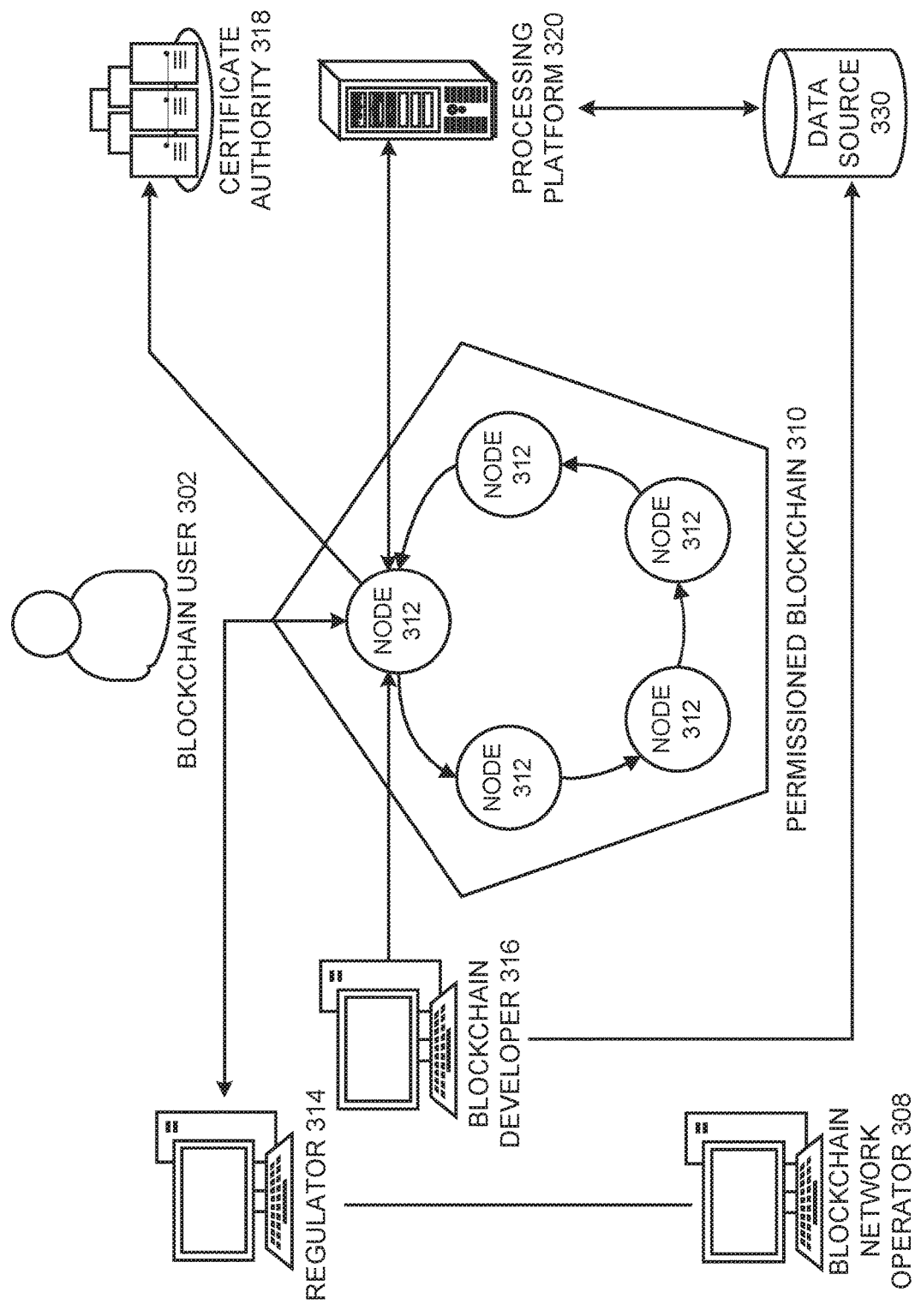
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client". An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4A:
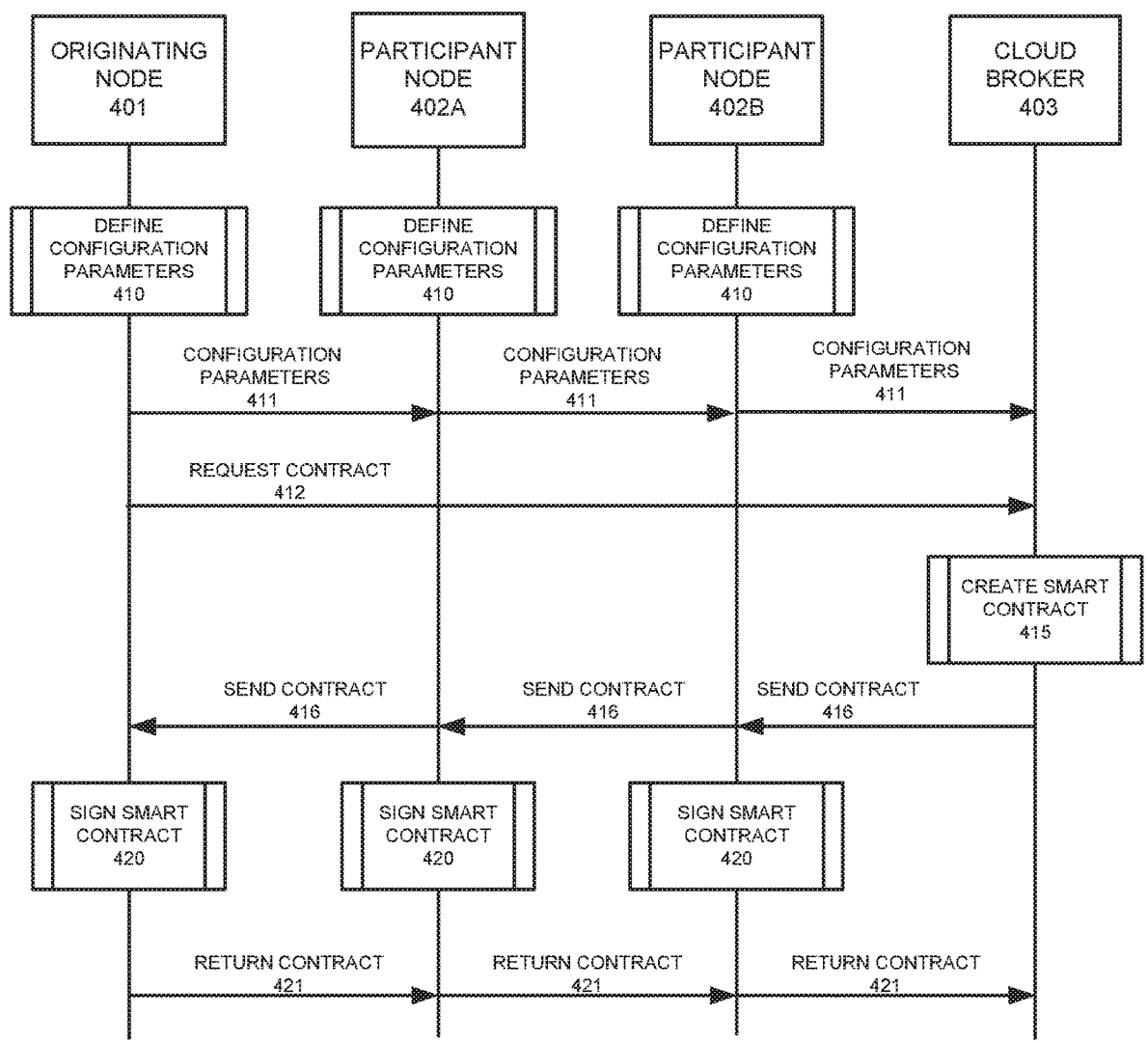
FIG. 4A illustrates a system messaging diagram for performing blockchain configuration, according to example embodiments.

FIG. 4A illustrates a system messaging diagram for performing blockchain configuration, according to example embodiments. Referring to FIG. 4A, the system diagram 400 includes an originating node 401, one or more participant nodes 402A, 402B, and a cloud broker 403. Each of the originating node 401 and each of the participant nodes 402A, 402B are organizations wishing to participate in secure document transfers. From the point of view of blockchain network configuration, the originating node 401 is equivalent to either of the participant nodes 402A, 402B.

The configuration process 400 begins when the originating node 401 and each of the participant nodes 402A, 402B are defined (not shown). There are many ways each of the nodes 401, 402 may be defined, and such definition is situationally dependent. Once each of the nodes 401, 402 are defined, each node 401, 402 defines configuration parameters 410 Configuration parameters 410 include registration and login parameters used to login to the cloud broker 403, such as a URL, a username, and a password. Each of the nodes 401, 402 transfers the configuration parameters 411 to the cloud broker 403. The originating node 401, initiating creation of a blockchain network 112, sends a contract request 412 to a cloud broker 403. The cloud broker 403, in response to receiving the contract request 412, creates a smart contract 415. All nodes 401, 402 that are to be included in the blockchain network 112 are required to sign the smart contract 415.

The cloud broker 403, after creating the smart contract 415, sends the smart contract 416 to each of the blockchain nodes 401, 402. The blockchain nodes 401, 402 receive the smart contract 415 and sign the smart contract 420 using a private key associated with each node 401, 402. Contents of the smart contract 415 are parsed and imported by each of the gateways 116. For example, there will be several virtual gateways created as the representation of each node's different partners. In other words, if node A has 2 partners and there will be 2 virtual gateways created to represent each of them. This mechanism applies to all partners, (ie. partner A, B, C, etc).

Finally, each of the nodes 401, 402 return the signed smart contract 421 to the cloud broker 403. At this point, the blockchain network 112 has been configured and document transfers may commence.

Figure 4B:
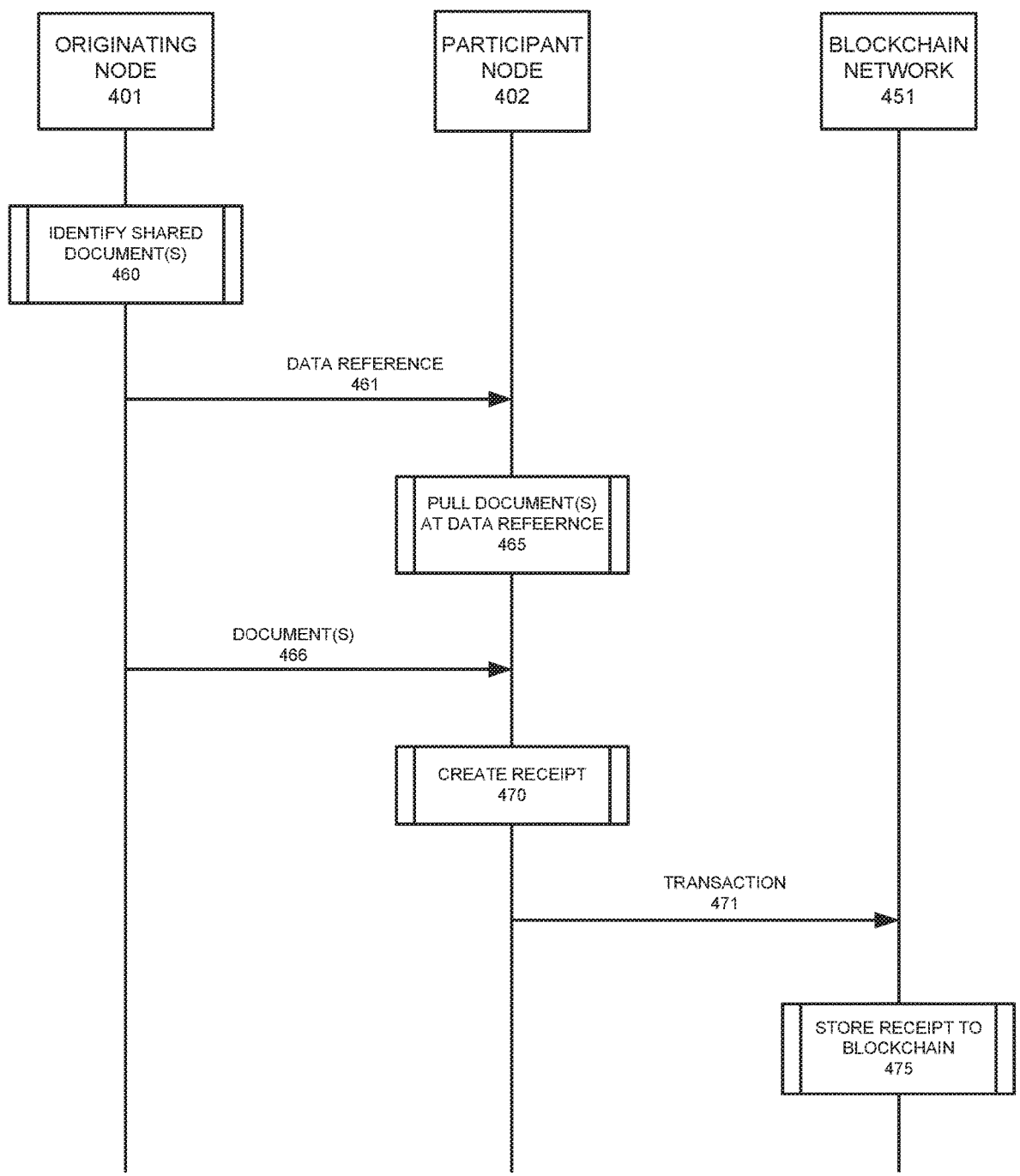
FIG. 4B illustrates a system messaging diagram for performing document transfers, according to example embodiments.

FIG. 4B illustrates a system messaging diagram for performing document transfers, according to example embodiments. Referring to FIG. 4B, the system diagram 450 includes the originating node 401, one or more participant nodes 402, and the blockchain network 451. Once the blockchain network 451 has been established, any node 401, 402 may share documents with other blockchain nodes 401, 402. System 450 illustrates the originating node 401 sharing a document with a different participating node 402.

The document sharing process 450 begins when the originating node 401 identifies one or more documents to share 460. The documents are stored behind a gateway 116 within network infrastructure of a node 104, perhaps within a database of a networked portion of the node 104. Next, the originating node 401 provides a data reference 461 to one or more participant nodes 402 that the originating node 401 wishes to share the documents 460 with. The data reference 461 is typically a URL pointing to a location in the originating node 401 where one or more documents are stored. The one or more participant nodes 402, after receiving the data reference 461, uses the data reference 461 to pull the identified documents 465 from the database of the originating node 401. The documents 466 are not processed as a blockchain transaction 132, but rather are transferred outside the blockchain network 112, 451 as described with reference to FIG. 1. A reversed tunnel connection is used to pull the documents 466 from the database.

Once the participating nodes 402 have received the documents 466, each participating node 402 creates a receipt 470. The receipt 470 includes a hash of the received documents 466, a salt, and an identifier of the participating node 402 that received the documents 466. Each participating node 402 then initiates a blockchain transaction 471 including the receipt 470. The blockchain network 451 validates the transaction(s) 471, and stores each receipt 470 to the blockchain 475. Specifically, the receipts 470 become part of the shared ledger 108 so that an immutable record of document transfers is maintained on the blockchain.

Figure 5A:
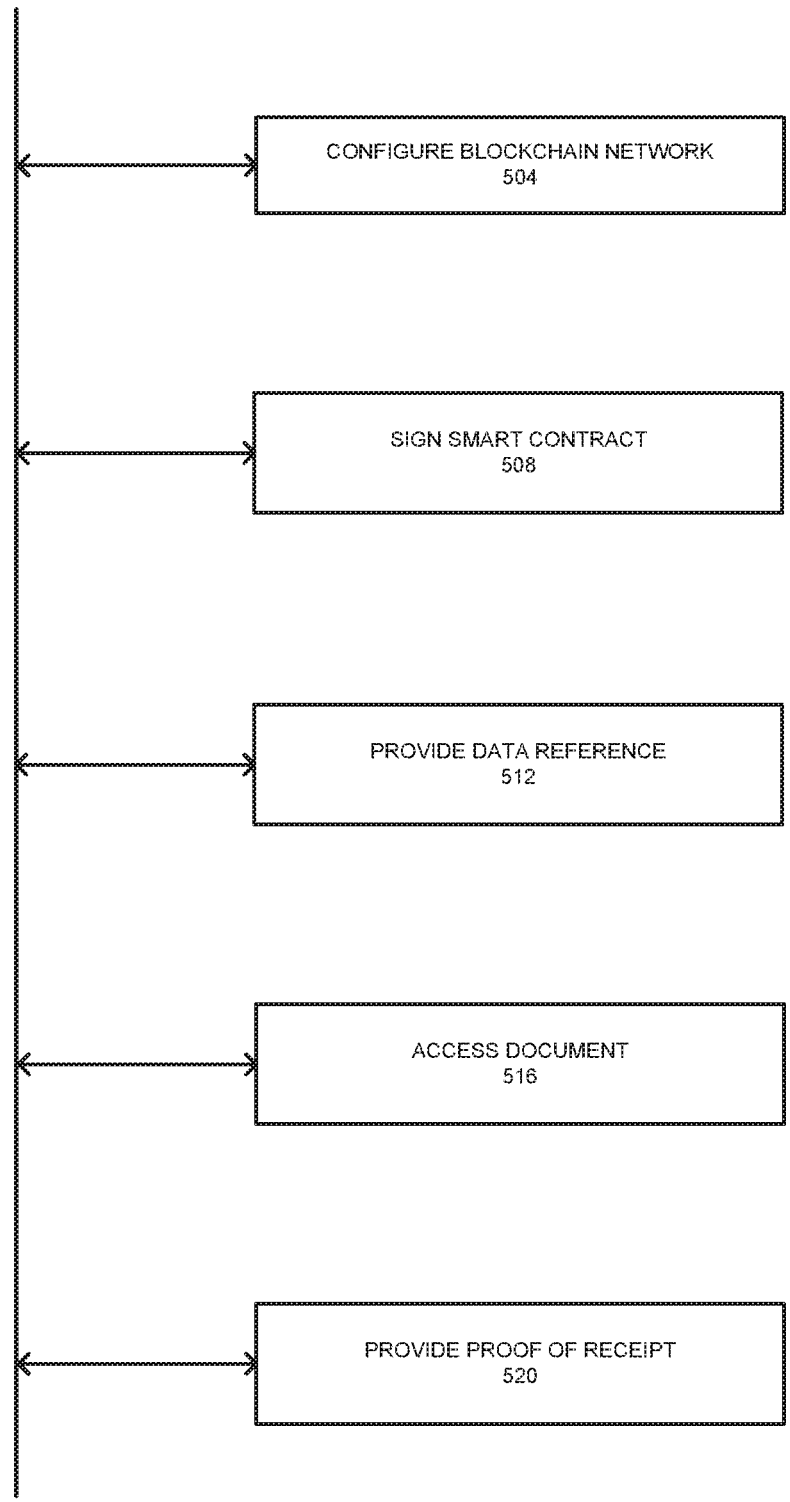
FIG. 5A illustrates a flow diagram of an example method of configuring and processing document transfer in a blockchain, according to example embodiments.

FIG. 5A illustrates a flow diagram 500 of an example method of configuring and processing document transfer in a blockchain, according to example embodiments. Referring to FIG. 5A, the method 500 may include configuring a blockchain network 504. The configuration steps for configuring the blockchain network 504 are shown and described in more detail with respect to FIG. 4A. Next, a smart contract is signed 508 by each of the blockchain nodes 104. Next, a blockchain node 104 that wishes to share one or more documents 136, 466 (i.e. an originating node 401), provides data reference 512 to other blockchain nodes 402. The other blockchain nodes 402 use the data reference 512 to access one or more documents 516 from an originating node 401. Finally, each of the blockchain nodes 402 that accesses documents 516 provides a proof of receipt 520 as blockchain transactions 132, 471.

Figure 5B:
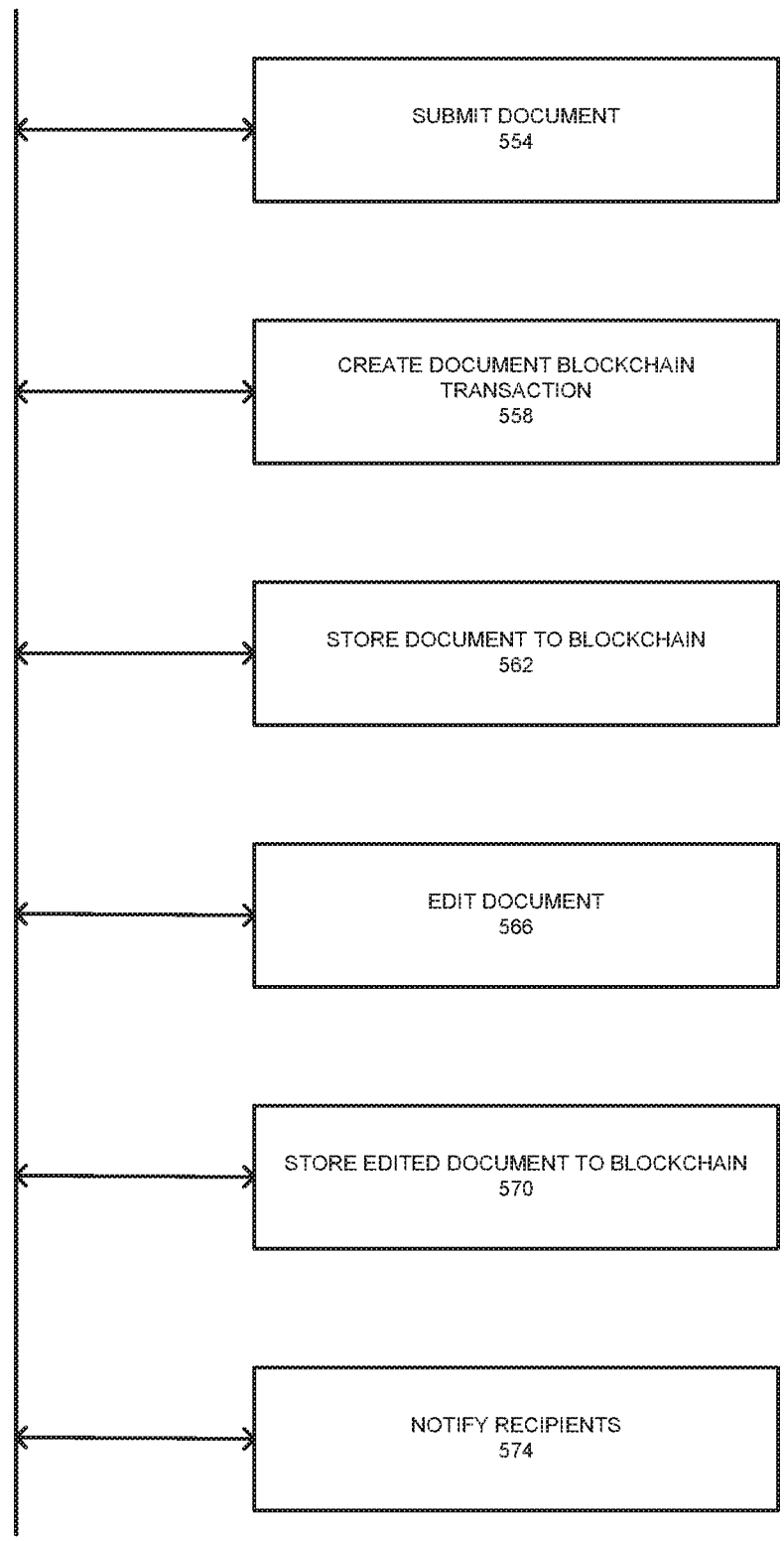
FIG. 5B illustrates a flow diagram of a document editing process using a blockchain, according to example embodiments.

FIG. 5B illustrates a flow diagram 550 of an example method of a document editing process using a blockchain, according to example embodiments. The method may include a submitter system receiving user input that indicates the job details for the release of a document, and stores the received user input. The job details may include setting a release time, intended recipients, editors and/or approvers, etc. The submitter system transmits (or otherwise provides) the job details to the system and transmits (or otherwise provides) the document to the system 554.

Once the document is received by the system 554, it is usually encrypted. At step 558, a blockchain transaction is created that includes the encrypted document or a hash thereof, this transaction is then submitted to the blockchain.

After being received at the blockchain, the transaction is stored in the blockchain 562. In some embodiments, the transaction is "from" the submitter and "to" one or more editors. In certain embodiments, the transaction is 'to' one or more approvers. If an editor is required, the editor is set and then notified. In certain examples, an editor is notified via email or the like that a document is ready to be reviewed and edited.

At step 566, the editor edits the document by accessing the document that was stored in accordance with the submitted blockchain transaction. Each edit session by the editor system may correspondingly cause the creation of a blockchain transaction for the edited document.

This new blockchain transaction is then submitted to the blockchain where it is stored 570 therein. Depending on the nature of the job, the transaction that is created may be from the editor back to the same editor (e.g., in the case of further edits being required), may be from the editor to another editor(s), or may be from the editor to one or more approvers. Different editors may use the same editor system or a different editor system (e.g., a different computer system). After editing, the system may determine (e.g., in accordance with the set job details) that the document no longer is being edited and then finalize the document. Finalizing the document may cause the creation and submission of another blockchain transaction by the system to the blockchain. Accordingly, the finalized document may be incorporated into the blockchain (e.g., by being cryptographically verified).

After finalizing the document, the system may also convert the document into a format that will be used for disseminating the document to the recipients. The converted document may also be saved to the blockchain. It will be appreciated that each successive blockchain transaction for a document may refer back to a prior blockchain transaction for that document (e.g., the unspent "outputs" of one blockchain transaction are used as "inputs" for a successive blockchain transaction). This may facilitate the creation and stability of an audit trail from the submission of the initial document through the eventual dissemination of the document to the recipients.

In any event, once the document has been finalized and is in the format that will be disseminated, the approvers will be notified. In certain examples, the notification may be a message that is delivered to an approver system, and in other examples the notification may be, for example, an email that is sent to an email address associated with an approver. The approver may approve, reject and discard, or reject and request further modifications via the approver system. If the approver completely rejects the document (e.g., via a reject command provided from the approver system), another blockchain transaction may be generated "to" a special trash address that is on the blockchain. The key for this address may be held by the system such that no outside parties (or perhaps even the system) could then unlock the document (or the transaction that contains the document) because it is signed by a public key for which no party has access to. The process would then repeat.

Finally, the approver may also approve the document for release (e.g., via an approval command provided from the approver system). When an approver approves the release of a document they may effectively be signing (from the perspective of the blockchain) the final transaction. Once signed, then any other conditions associated with the transaction (e.g., a timed release) would then wait to be fulfilled. In the meantime, the system monitors the blockchain for when the script associated with this "final" transaction has been fulfilled. If it has been fulfilled, then the system may notify the recipients 574 that the document is now available on the blockchain and/or recipient systems may directly monitor the blockchain such that blockchain effectively notifies the recipients of the expiration of the script associated with the final blockchain transaction. In certain example embodiments, the document may be made available by having the system send an email or other communication to the recipients with the document. Accordingly, the document that was initially uploaded may be secured and timely delivered to the intended recipients.

Figure 6A:
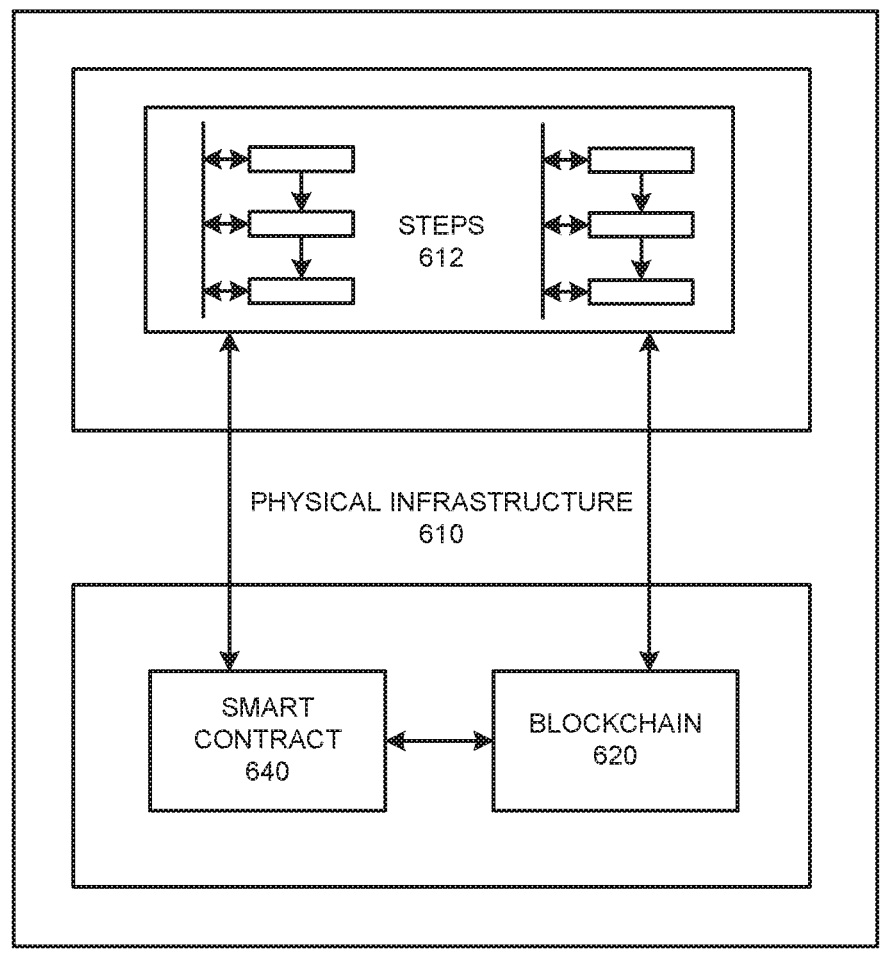
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600 includes a physical infrastructure 610 with a blockchain 620 and a smart contract 640, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 640 and/or blockchains 620 that reside on the physical infrastructure 610 of a computer system configuration. The data can be output from an executed smart contract 640 and/or blockchain 620. The physical infrastructure 610 may include one or more computers, servers, processors, memories, and/or wireless communication devices.

Figure 6B:
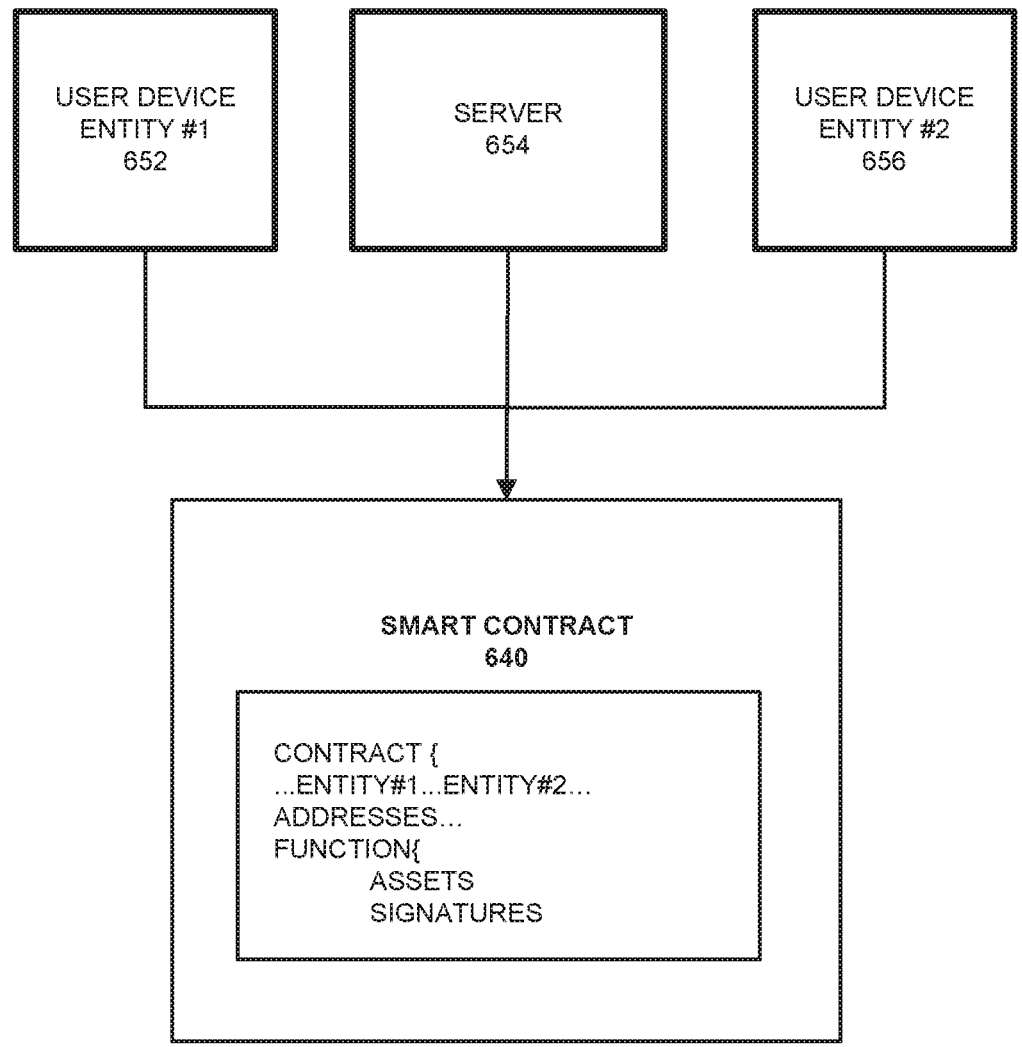
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650 may represent a communication session, an asset transfer session or a process or procedure that is driven by a smart contract 640 which explicitly identifies one or more user devices 652 and/or 656. The execution, operations and results of the smart contract execution may be managed by a server 654. Content of the smart contract 640 may require digital signatures by one or more of the entities 652 and 656 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
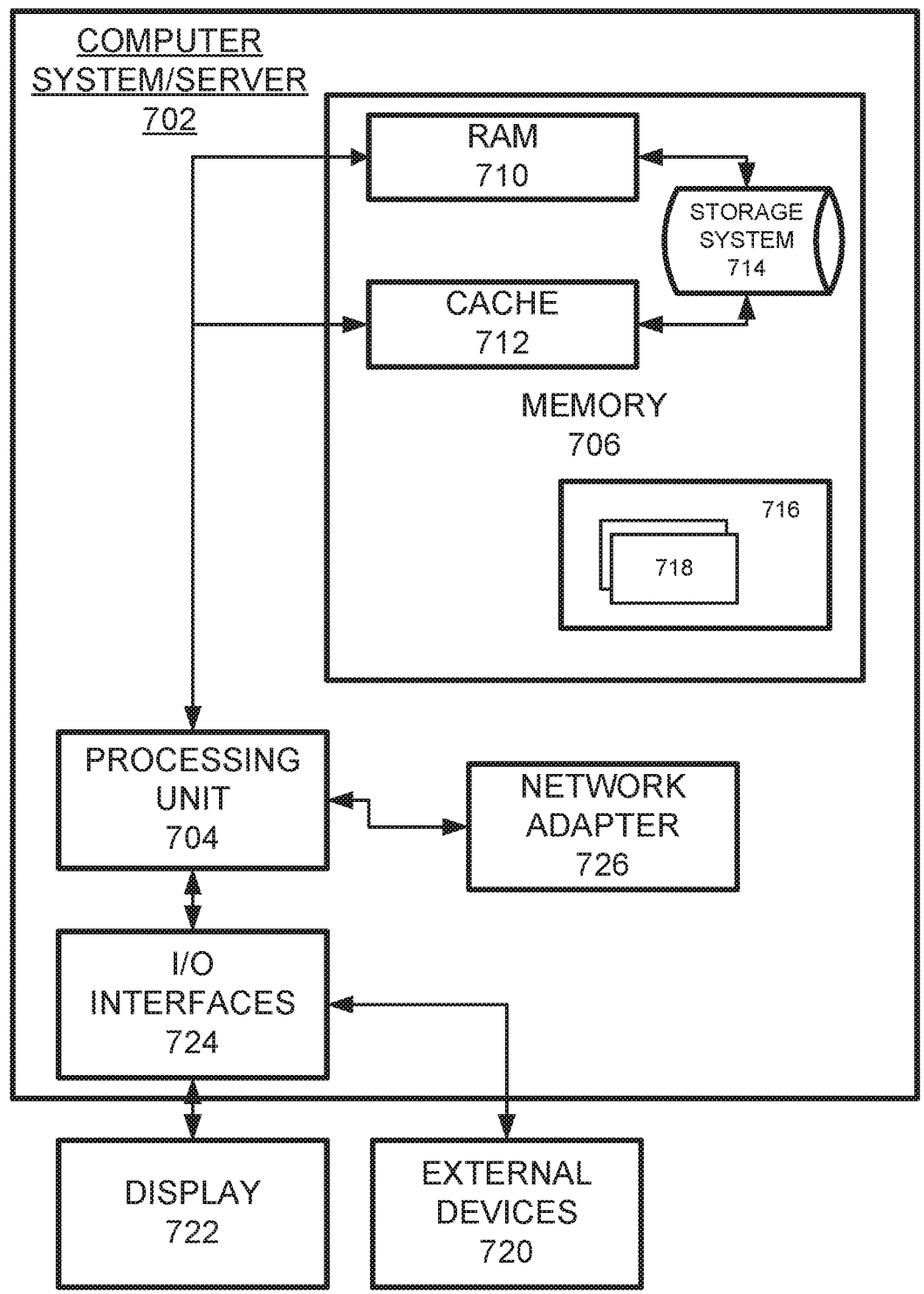
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
storing a smart contract comprising virtual private network (VPN) configuration information for accessing a plurality of virtual business-to-business (B2B) gateways coupled to a plurality of blockchain nodes of a blockchain network, respectively;
receiving, from a first blockchain node among the plurality of blockchain nodes via a blockchain ledger of the blockchain network, an IP address for a second blockchain node among the plurality of blockchain nodes which identifies a location associated with the first blockchain node outside of the blockchain ledger where a document is available;
establishing a VPN tunnel outside of the blockchain ledger between a virtual B2B gateway of the second blockchain node and a virtual B2B gateway of the first blockchain node based on the IP address received via the blockchain ledger;
transferring a document to the virtual B2B gateway of the second blockchain node via the established VPN tunnel outside of the blockchain network; and
storing a confirmation of reading the document which comprises a salt of the second blockchain node via a blockchain transaction on the blockchain ledger.

2. The method of claim 1, wherein the storing comprise storing proof of receipt of the document from the second blockchain node, where the proof of receipt comprises a hash of the document and one or more of a salt and an identifier of a blockchain node that received the document.

3. The method of claim 1, wherein the IP address comprises an IP address of an off-chain network of the first blockchain node.

4. The method of claim 1, wherein the smart contract is created by a cloud broker, and the smart contract further comprises communication parameters of the cloud broker.

5. The method of claim 4, wherein the cloud broker establishes a reversed virtual connection to each of the virtual B2B gateways of the first and second blockchain nodes using VPN configuration information stored in the smart contract.

6. The method of claim 1, wherein the smart contract is signed by respective private keys of the plurality of blockchain nodes.

7. A system, comprising:
a processor configured to:
store a smart contract comprising virtual private network (VPN) configuration information for accessing a plurality of virtual business-to-business (B2B) gateways coupled to a plurality of blockchain nodes of a blockchain network, respectively,
receive, from a first blockchain node among the plurality of blockchain nodes via a blockchain ledger of the blockchain network, an IP address for a second blockchain node among the plurality of blockchain nodes which identifies a location associated with the first blockchain node outside of the blockchain ledger where a document is available, and
establish a VPN tunnel outside of the blockchain ledger between a virtual B2B gateway of the second blockchain node and a virtual B2B gateway of the first blockchain node based on the IP address received via the blockchain ledger,
transfer a document to the virtual B2B gateway of the second blockchain node via the established VPN tunnel outside of the blockchain network, and
store a confirmation of reading the document which comprises a salt of the second blockchain node via a blockchain transaction on the blockchain ledger.

8. The system of claim 7, wherein the processor is configured to store proof of receipt of the document from the second blockchain node, where the proof of receipt comprises a hash of the document and one or more of a salt and an identifier of the second blockchain node.

9. The system of claim 7, wherein the IP address comprises an IP address of an off-chain network of the first blockchain node.

10. The system of claim 7, wherein the smart contract via a cloud broker, and the smart contract further comprises communication parameters of the cloud broker.

11. The system of claim 10, wherein the cloud broker establishes a reversed virtual connection to each of the virtual B2B gateways of the first and second blockchain nodes using VPN configuration information stored in the smart contract.

12. The system of claim 7, wherein the smart contract is signed by respective private keys of the plurality of blockchain nodes.

13. A non-transitory computer readable medium comprising instructions, that when read by a processor, cause the processor to perform a method comprising:
storing a smart contract comprising virtual private network (VPN) configuration information for accessing a plurality of virtual business-to-business (B2B) gateways coupled to a plurality of blockchain nodes of a blockchain network, respectively;
receiving, from a first blockchain node among the plurality of blockchain nodes via a blockchain ledger of the blockchain network, an IP address for a second blockchain node among the plurality of nodes which identifies a location associated with the first blockchain node where a document is available;
establishing a VPN tunnel outside of the blockchain ledger between a virtual B2B gateway of the second blockchain node and a virtual B2B gateway of the first blockchain node based on an IP address received via the blockchain ledger;
transferring a document to the virtual B2B gateway of the second blockchain node via the established VPN tunnel outside of the blockchain network; and
storing a confirmation of reading the document which comprises a salt of the second blockchain node via a blockchain transaction on the blockchain ledger.

14. The non-transitory computer readable medium of claim 13, wherein the storing comprises storing proof of receipt of the document from the second blockchain node, where the proof of receipt comprises a hash of the document and one or more of a salt and an identifier of a blockchain node that received the document.

15. The non-transitory computer readable medium of claim 13, wherein the IP address comprises an IP address of an off-chain network of the first blockchain.

16. The non-transitory computer readable medium of claim 13, wherein the smart contract is created by a cloud broker, and the smart contract further comprises communication parameters of the cloud broker.

17. The non-transitory computer readable medium of claim 16, wherein the cloud broker establishes a reversed virtual connection to each of the first and second blockchain nodes using VPN configuration information stored in the smart contract.

\* \* \* \* \*